UNITED STATES PATENT OFFICE.

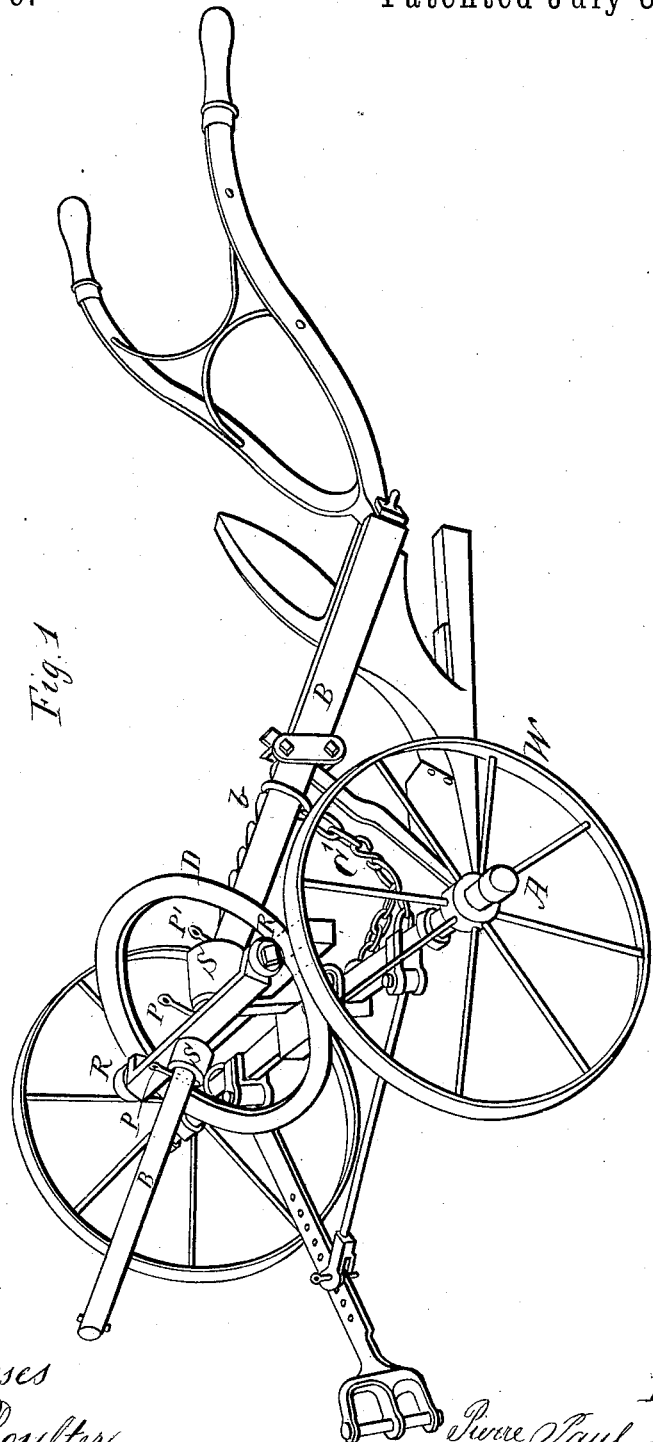

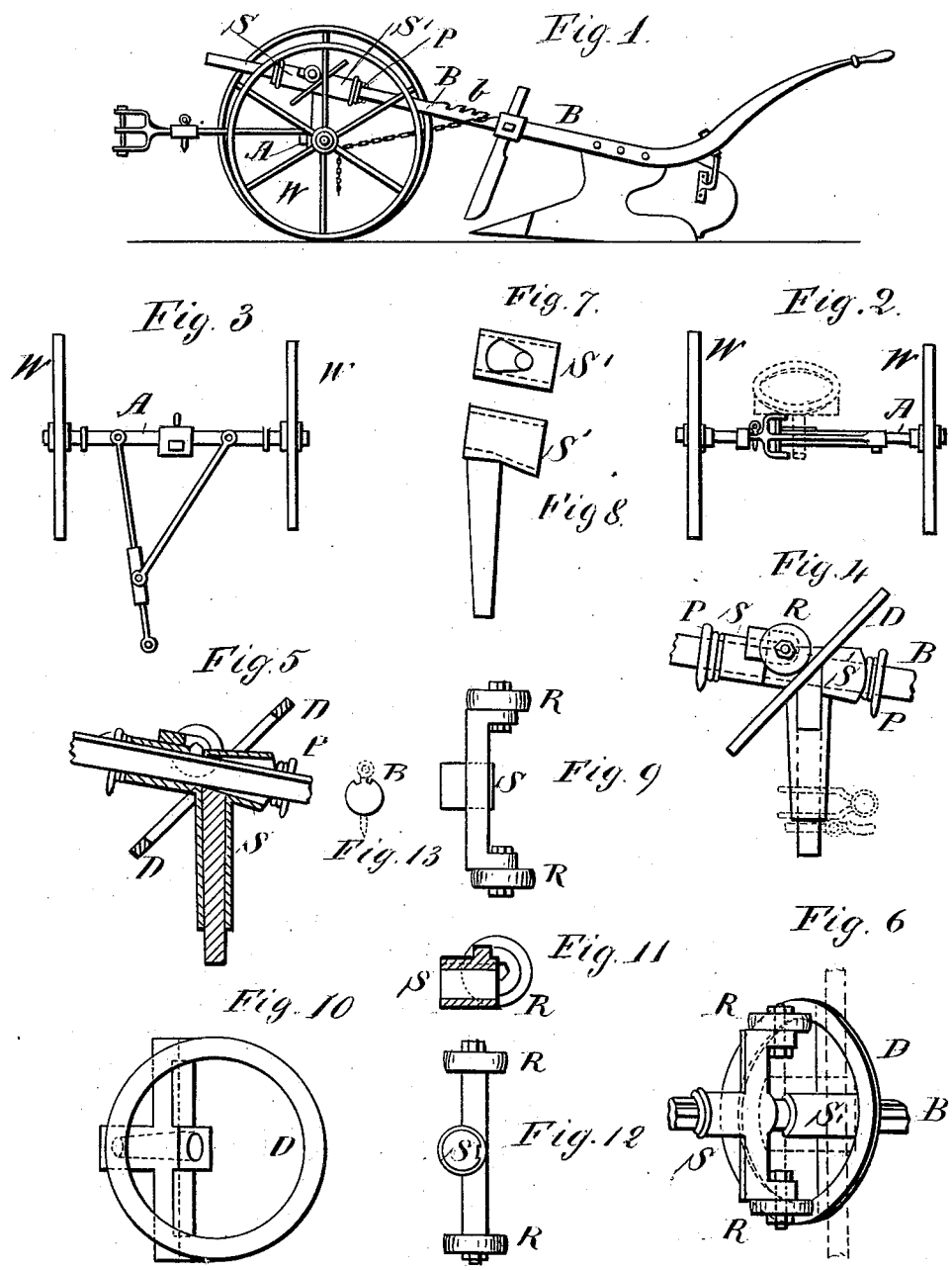

PIERRE PAUL JACOTOT, OF ORGEUX, FRANCE.

MOVING PLOW.

SPECIFICATION forming part of Letters Patent No. 280,479, dated July 3, 1883.

Application filed January 13, 1883. (No model.) Patented in France June 8, 1882, No. 149,400; in Belgium October 21, 1882; in England October 21, 1882; in Spain October 22, 1882; in Germany October 23, 1882; in Austria October 27, 1882, and in Italy October 27, 1882.

*To all whom it may concern:*

Be it known that I, PIERRE PAUL JACOTOT, a citizen of the French Republic, and a resident of Orgeux, in the French Republic, have invented a certain new and useful Improvement in Moving Plows; and I do hereby declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to improvements in plows; and it consists in the peculiar construction and operation of mechanism whereby the plow point or share is automatically withdrawn from the soil when the power is applied on a line at an angle to the line of draft, whereby said plow point or share is again made to automatically engage with and penetrate the soil as soon as such power is applied in a direction with the line of draft, whereby the point or share may be held in a position to prevent its engaging with or penetrating the soil during the removal of the plow from place to place or field to field, and whereby the plow is adapted for operation without guiding or holding the same, as usual; and, lastly, whereby such plow may be converted into the ordinary form of plow, all as hereinafter more fully described, and specifically pointed out in the claims, and as shown in the accompanying drawings, in which—

Figure 1 is a perspective view. Fig. 1ª is an elevation of a plow constructed according to my invention; Figs. 2 and 3, a front elevation and plan view, respectively, of the running-gear. Fig. 4 is a side elevation, Fig. 5 a vertical longitudinal section, and Fig. 6 a perspective view, of the mechanism for tilting the plow-beam and plow; and Figs. 7, 8, 9, 10, 11, 12, and 13 are detail views of the same.

Like letters indicate like parts in the above figures of drawings.

W indicates the drive-wheels; A, the drive-wheel axle.

S is a pivoted sleeve through which passes the plow-beam, that is provided with two grooves.

D is a disk supported by a square hollow standard connected with the running-gear by means of a suitable bearing adapted for vertical adjustment.

S' is a sleeve, conical vertically, that carries the plow-beam, the extremity of which is connected with the running-gear by means of pins.

B is the plow-beam, provided with two longitudinal ribs or splines, one above to hold the plow vertically to its work, and one on the side to tilt the plow laterally when it is to be thrown out of operation. At the extremity of the plow-beam the two ribs or splines are merged into one, so as to permit the sleeve S to change track. Said plow-beam has a number of perforations at equal distance from each other, so as to make the sleeves S S' adjustable thereon by means of the retaining pins or bolts P P'. The plow is thrown into or out of operation by the direction of traction.

When a furrow is commenced, the plow is held to its work, and as soon as the furrow is finished and the running-gear is rotated upon the conical standard of the sleeve S' the two rollers R R, connected with the sleeve S, rotate along the inclined disk D, and said sleeve S tilts the plow-beam and throws the point or share of the plow out of engagement with the soil. The depth of furrow is adjusted in the well-known manner by means of the holdback-chains C', the plow-beam being provided with a series of notches or teeth, *b*, for this purpose, and by a corresponding adjustment of the sleeves S S' by means of the pins P P'. The disk D is rigidly supported by cross-arms from the hollow standard in an inclined position. The sleeve S is rigidly secured or formed upon a cross-head that carries the rollers R, through which sleeve and cross-head the plow-beam passes. It is evident that when the line of draft changes from a straight line the position of the disk relatively to the plow-beam also changes, the right half or left half of the disk turning with the axle A and causing one of the rollers to move up the incline and the other down said incline, thereby rotating the plow-beam and plow, causing the latter to leave the soil, the sleeve S and roller-arm or cross-head being rigidly connected with said plow-beam, while the sleeve S' is, so far as lateral movement is concerned, rigidly connected with the hollow standard, and in this manner the plow is turned out of the furrow according to the variation of the direction of draft from a straight line. When a new furrow is commenced, and as soon as the power is applied in the line of traction, the sleeve S reverses its movement and throws the plow automatically into operation. By means of this peculiarly-constructed mechanism a single man can manage the plow, and he does not need to have any experience of the work, provided he can lead a horse or horses properly. The handles therefore serve only to lift the plow around when turning a sharp corner.

To convert the plow into the form of an ordinary wheel-plow, it is simply necessary to move the sleeve S and its rollers out of contact with the disk D, or to the outer end of the plow-beam; and if it is desired to convert the plow into an ordinary plow the running-gear and operating mechanism are removed by simply removing the pins P P' and sliding the plow-beam out of the sleeves S S'.

Having thus described my invention, what I claim is—

1. In a wheel-plow, the combination, with the drive-wheel axle, an inclined disk, and the plow-beam having two grooved tracks, of a sleeve adapted for engagement with one or the other of said tracks to tilt the plow-beam, or return it into its normal position when the direction of power or the direction of horizontal motion of the drive-wheel axle changes, as described, for the purpose specified.

2. In a wheel-plow, the combination, with the drive-wheel axle and plow-beam, of the disk D and sleeves S S', the former carrying two rollers, R R, as and for the purpose specified.

3. In a convertible wheel-plow, the combination, with the drive-wheel axle and plow-beam, of the detachable disk D and detachable sleeves S S', substantially as and for the purpose specified.

4. The combination, with the plow-beam B, provided with two grooved tracks and a series of perforations, of the detachable sleeves S S', substantially as and for the purpose specified.

In testimony that I claim the foregoing I have hereunto set my hand this 3d day of October, 1882.

JACOTOT.

Witnesses:
LOUIS COUNAINT,
FREDERIC MATRAY.